United States Patent
Wu et al.

(10) Patent No.: US 11,886,479 B2
(45) Date of Patent: Jan. 30, 2024

(54) ONLINE DATA ACQUISITION METHOD AND SYSTEM

(71) Applicant: GUANGZHOU QUICK DECISION INFORMATION TECHNOLOGY CO., LTD., Guangzhou (CN)

(72) Inventors: Lianwang Wu, Guangzhou (CN); Shaohui Li, Guangzhou (CN); Yutao Zou, Guangzhou (CN)

(73) Assignee: GUANGZHOU QUICK DECISION INFORMATION TECHNOLOGY CO., LTD., Guangzhou (CN)

( * ) Notice: Subject to any disclaimer, the term of this patent is extended or adjusted under 35 U.S.C. 154(b) by 70 days.

(21) Appl. No.: 17/606,787

(22) PCT Filed: Nov. 26, 2020

(86) PCT No.: PCT/CN2020/131852
§ 371 (c)(1),
(2) Date: Oct. 27, 2021

(87) PCT Pub. No.: WO2021/104385
PCT Pub. Date: Jun. 3, 2021

(65) Prior Publication Data
US 2022/0237218 A1    Jul. 28, 2022

(30) Foreign Application Priority Data
Nov. 27, 2019  (CN) .......................... 201911179269.X (51) Int. Cl.
*G06F 16/35* (2019.01)
*G06F 16/332* (2019.01)

(52) U.S. Cl.
CPC .......... *G06F 16/35* (2019.01); *G06F 16/3329* (2019.01)

(58) Field of Classification Search
CPC .................................. G06F 16/35; G06F 6/35
See application file for complete search history.

(56) References Cited

U.S. PATENT DOCUMENTS

| 10,430,815 B1 | 10/2019 | Comer et al. |
| 2005/0075919 A1* | 4/2005 | Kim ....................... G06Q 30/02 705/7.26 |

(Continued)

FOREIGN PATENT DOCUMENTS

| CN | 101315680 A | 12/2008 |
| CN | 102034188 A | 4/2011 |

(Continued)

OTHER PUBLICATIONS

International Search Report, issued in PCT/CN2020/131852, dated Feb. 8, 2021.

(Continued)

*Primary Examiner* — Van H Oberly
(74) *Attorney, Agent, or Firm* — Bayramoglu Law Offices LLC (57) ABSTRACT

The embodiments of the specification disclose an online data acquisition method and system, The method includes that: an acquisition terminal generates a first data acquisition module online according to a preset rule, and sends the first data acquisition module to multiple first target terminals; after receiving the first data acquisition module online, the multiple first target terminals feed back multiple pieces of first data online in first preset time, and return the multiple pieces of fed back first data to the acquisition terminal online; and the acquisition terminal performs online analysis based on the multiple pieces of received first data. According to the method provided in the application, it is ensured that survey is performed in real time, and a survey result may be analyzed without any delay.

16 Claims, 5 Drawing Sheets

(56) References Cited

U.S. PATENT DOCUMENTS

| | | | | |
|---|---|---|---|---|
| 2007/0226047 A1* | 9/2007 | Ward | ..................... | G06Q 30/02 |
| | | | | 705/7.32 |
| 2016/0380837 A1 | 12/2016 | Payne | | |
| 2018/0261203 A1* | 9/2018 | Zoller | .................... | G06N 5/046 |
| 2019/0066136 A1* | 2/2019 | Kopikare | ............... | G06N 5/046 |
| 2020/0219151 A1* | 7/2020 | Beltrani | ............ | G06Q 30/0282 |

FOREIGN PATENT DOCUMENTS

| | | | |
|---|---|---|---|
| CN | 102903022 | A | 1/2013 |
| CN | 108428152 | A | 8/2018 |
| CN | 109461037 | A | 3/2019 |
| CN | 110348006 | A | 10/2019 |
| CN | 110837551 | A | 2/2020 |
| IN | 108763199 | A | 11/2018 |

OTHER PUBLICATIONS

Written Opinion, issued in PCT/CN2020/131852, dated Feb. 8, 2021.
Search Report 1, issued in CN201911179269.X (priority application), by CNIPA, dated May 22, 2020.
Search Report 2, issued in CN201911179269.X (priority application), by CNIPA, dated May 22, 2020.
Examination Report 1, issued in CN201911179269.X (priority application), by CNIPA, dated May 22, 2020.
Examination Report 2, issued in CN201911179269.X (priority application), by CNIPA, dated May 22, 2020.

* cited by examiner

ONLINE DATA ACQUISITION METHOD AND SYSTEM

CROSS-REFERENCE TO RELATED APPLICATIONS

The present application claims priority to Chinese Patent Application No. 201911179269, filed to the China National Intellectual Property Administration on Nov. 27, 2019 and entitled "Online Data Acquisition Method and System", the disclosure of which is hereby incorporated by reference in its entirety.

TECHNICAL FIELD

The application relates to the technical field of Internet, and particularly to an online data acquisition method and system.

BACKGROUND

Survey refers to systematically and objectively collecting, researching and analyzing information in various investigation manners to predict future development trends of various industries to prepare for decision-making of investment and development directions.

In a related art, survey is divided into qualitative survey and quantitative survey. Qualitative survey mainly calls users meeting a quota requirement (for example, 20 users) all over the country for deep interviewing at the same time and the same place. However, such a qualitative survey manner is high in cost and low in data analysis efficiency.

Therefore, how to implement low-cost and efficient data analysis for qualitative survey becomes a problem urgent to be solved at present.

SUMMARY

One of embodiments of the application provides an online data acquisition method, which includes that: an acquisition terminal generates a first data acquisition module online according to a preset rule, and sends the first data acquisition module to multiple first target terminals; after receiving the first data acquisition module online, the multiple first target terminals feed back multiple pieces of first data online in first preset time, and return the multiple pieces of fed back first data to the acquisition terminal online; and the acquisition terminal performs online analysis based on the multiple pieces of received first data.

In some embodiments, the operation that the multiple first target terminals are determined includes that: recruitment information is sent to multiple target terminals online; the multiple target terminals give multiple pieces of feedback information for the recruitment information; and the acquisition terminal screens the feedback information according to a preset screening rule, and determines the target terminals corresponding to feedback information obtained by screening as the multiple first target terminals.

In some embodiments, the online data acquisition method further includes that: after the multiple first target terminals return the multiple pieces of fed back first data to the acquisition terminal online, the acquisition terminal generates a second data acquisition module online according to the multiple pieces of first data and/or the preset rule, and sends the second data acquisition module to the multiple first target terminals online; the multiple first target terminals feed back multiple pieces of second data online in second preset time after receiving the second data acquisition module online; the acquisition terminal performs online analysis based on the multiple pieces of received second data; and the steps are repeated until data acquisition is completed.

In some embodiments, the online data acquisition method further includes that: the acquisition terminal performs online analysis on the multiple pieces of first data and/or the multiple pieces of second data according to related information of the first data acquisition module and/or the second data acquisition module.

In some embodiments, the related information includes a type and/or importance.

In some embodiments, the operation that the acquisition terminal performs online analysis on the multiple pieces of first data and/or the multiple pieces of second data according to the related information of the first data acquisition module and/or the second data acquisition module includes that: when the type in the related information is an open question, the acquisition terminal inputs the multiple pieces of first data and/or multiple pieces of second data fed back by the multiple first target terminals for the open question to a text recognition model to obtain recognition results.

In some embodiments, the recognition result includes a viewpoint extraction result and/or a viewpoint clustering result.

In some embodiments, the text recognition model is a text classification model and/or an unsupervised learning clustering model.

In some embodiments, a training process of the text classification model is as follows: at least one response information text of at least one open question is obtained; a label of the at least one response information text is made, the label representing a viewpoint of each of at least one piece of response information; and the response information text containing the label is input to an initial text classification model, and training is performed to obtain a trained text classification model.

In some embodiments, the operation that the acquisition terminal performs online analysis on the multiple pieces of first data and/or the multiple pieces of second data according to the related information of the first data acquisition module and/or the second data acquisition module includes that: when the type in the related information is a choice question, a true-false question, a click-to-select question, or an image hotspot question, the acquisition terminal makes statistics to the numbers of times that different options are selected and/or ratios of the different options in the multiple pieces of first data and/or multiple pieces of second data fed back by the multiple first target terminals for the choice question, the true-false question, the click-to-select question, or the image hotspot question.

In some embodiments, the operation that the acquisition terminal performs online analysis on the multiple pieces of first data and/or the multiple pieces of second data according to the related information of the first data acquisition module and/or the second data acquisition module includes that: when the type in the related information is a sequencing question, the acquisition terminal makes statistics to sequencing results of each option in the multiple pieces of first data and/or multiple pieces of second data fed back by the multiple first target terminals for the sequencing question.

In some embodiments, the multiple first target terminals are terminals used by more than 20 respondents answering survey questions.

Another aspect of the embodiments of the specification provides an online data acquisition system, which includes:

a presenter module, configured for an acquisition terminal to generate a first data acquisition module online according to a preset rule, and send the first data acquisition module to multiple first target terminals;

a respondent module, configured for the multiple first target terminals to, after receiving the first data acquisition module online, feed back multiple pieces of first data online in first preset time, and return the multiple pieces of fed back first data to the acquisition terminal online; and an analysis module, configured for the acquisition terminal to perform online analysis based on the multiple pieces of received first data.

Another aspect of the embodiments of the specification provides an online data acquisition method, which includes that: an acquisition terminal generates a first data acquisition module online according to a preset rule, and sends the first data acquisition module to multiple first target terminals for the multiple first target terminals to feed back multiple pieces of first data online in first preset time after receiving the first data acquisition module online; the acquisition terminal receives the multiple pieces of fed back first data returned by the multiple first target terminals; and the acquisition terminal performs online analysis based on the multiple pieces of received first data.

In some embodiments, after the operation that the acquisition terminal receives the multiple pieces of fed back first data returned by the multiple first target terminals, the method further includes that: the acquisition terminal generates a second data acquisition module online according to the multiple pieces of first data and/or the preset rule, and sends the second data acquisition module to the multiple first target terminals online for the multiple first target terminals to feed back multiple pieces of second data online in second preset time after receiving the second data acquisition module online; the acquisition terminal performs online analysis based on the multiple pieces of received second data; and the steps are repeated until data acquisition is completed.

In some embodiments, the acquisition terminal performs online analysis on the multiple pieces of first data and/or the multiple pieces of second data according to related information of the first data acquisition module and/or the second data acquisition module, wherein the operation that the acquisition terminal performs online analysis on the multiple pieces of first data and/or the multiple pieces of second data according to the related information of the first data acquisition module and/or the second data acquisition module includes that: when a type in the related information is an open question, the acquisition terminal inputs the multiple pieces of first data and/or multiple pieces of second data fed back by the multiple first target terminals for the open question to a text recognition model to obtain recognition results; when the type in the related information is a choice question, a true-false question, a click-to-select question, or an image hotspot question, the acquisition terminal makes statistics to the numbers of times that different options are selected and/or ratios of the different options in the multiple pieces of first data and/or multiple pieces of second data fed back by the multiple first target terminals for the choice question, the true-false question, the click-to-select question, or the image hotspot question; and when the type in the related information is a sequencing question, the acquisition terminal makes statistics to sequencing results of each option in the multiple pieces of first data and/or multiple pieces of second data fed back by the multiple first target terminals for the sequencing question.

Yet another aspect of the embodiments of the specification provides an online data acquisition method, which includes that: a first target terminal receives a first data acquisition module sent by an acquisition terminal, the first data acquisition module being generated by the acquisition terminal online according to a preset rule; and the first target terminal feeds back first data online in preset time, and returns the fed back first data to the acquisition terminal online for the acquisition terminal to perform online analysis based on multiple pieces of first data returned by multiple first target terminals.

Another aspect of the embodiments of the specification provides an online data acquisition system, which includes an acquisition terminal and multiple first target terminals. The acquisition terminal is configured to execute the online data acquisition method provided in the another aspect. The first target terminal is configured to execute the online data acquisition method provided in the yet another aspect.

Another aspect of the embodiments of the specification provides an online data acquisition apparatus, which includes a processor, configured to execute the abovementioned online data acquisition method.

Another aspect of the embodiments of the specification provides a computer-readable storage medium, which stores a computer instruction. The computer executes the abovementioned online data acquisition method after reading the computer instruction in the storage medium.

BRIEF DESCRIPTION OF THE DRAWINGS

The application will further be described with exemplary embodiments. These exemplary embodiments will be described in detail through the drawings. These embodiments are unrestrictive. In these embodiments, the same numbers represent the same structures.

DETAILED DESCRIPTION OF THE EMBODIMENTS

For describing the technical solutions of the embodiments of the application more clearly, the drawings required to be used in the description of the embodiments will be briefly introduced below. It is apparent that the drawings in the following description are only some examples or embodiments of the application. Those of ordinary skill in the art may further apply the application to other similar scenes according to these drawings without creative work. Unless apparent from the language environment or otherwise stated, the same reference signs in the drawings represent the same structures or operations.

It should be understood that "system", "apparatus", "unit", and/or "module" used herein are/is methods/a method used to distinguish different components, elements, parts, portions, or assemblies of different levels. However, if other terms may achieve the same purpose, these terms may be replaced with other expressions.

As shown in the application and the claims, terms such as "a/an", "one", "a kind of", and "the" do not refer in particular to a singular form but may also include a plural form, unless exceptional cases are clearly indicated in the context. In general, terms "include" and "contain" only indicate inclusion of steps and elements that are clearly identified, these steps and elements do not form an exclusive enumeration, and a method or a device may also include other steps or elements.

In the application, the flowchart is used to describe operations executed by a system according to the embodiments of the application. It should be understood that previous or subsequent operations are not always executed accurately in sequence. Instead, each step may be processed in an inverted sequence or at the same time. In addition, other operations may also be added to these processes, or one or more operations may be removed from these processes.

Figure 1:
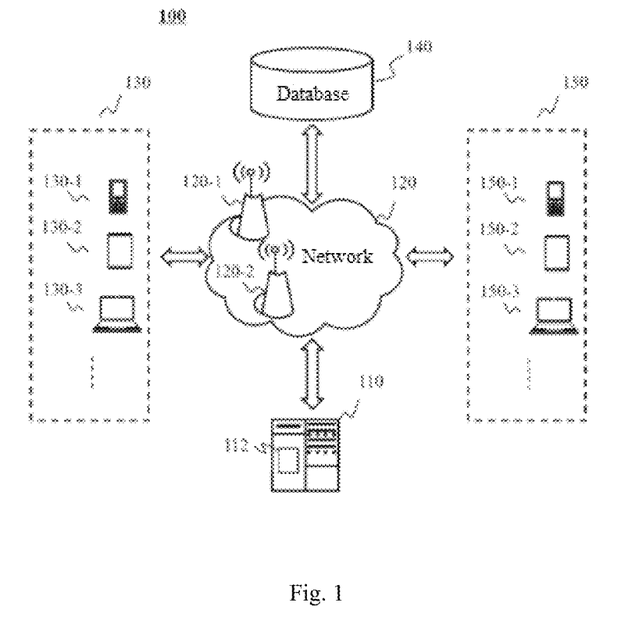
FIG. 1 is an exemplary schematic diagram of an application scene of an online data acquisition system according to some embodiments of the application.

FIG. 1 is an exemplary schematic diagram of an application scene of an online data acquisition system 100 according to some embodiments of the specification.

The online data acquisition system 100 may implement one-to-many online survey and perform real-time online analysis according to feedback information of target terminals. For example, the online data acquisition system 100 may be used to the field of questionnaires. Specifically, a survey question may be sent to multiple respondents to implement one-to-many online survey. Answer contents fed back by the respondents in specified answering time may also be received, and the answer contents may be analyzed online, thereby implementing real-time analysis data and avoiding a data analysis delay. The online data acquisition system 100 may be an online service platform for Internet service. For example, the online data acquisition system 100 may be used for an online questionnaire survey platform. The online data acquisition system 100 may include a server 110, a network 120, a target terminal 130, a database 140, and an acquisition terminal 150. The server 110 may include a processing device 112.

In some embodiments, the server 110 may be configured to process information and/or data related to online data acquisition. For example, the server 110 may analyze first data fed back by a first target terminal. The server 110 may be an independent server or a server group. The server group may be centralized or distributed (for example, the server 110 may be a distributed system). In some embodiments, the server 110 may be regional or remote. For example, the server 110 may access information and/or data stored in the target terminal 130 and the database 140 through the network 120. In some embodiments, the server 110 may be directly connected with the target terminal 130 and the database 140 to access the information and/or data stored therein. In some embodiments, the server 110 may be executed in a cloud platform. For example, the cloud platform may include one or any combination of a private cloud, a public cloud, a mixed cloud, a community cloud, a distributed cloud, an internal cloud, etc.

In some embodiments, the server 110 may include the processing device 112. The processing device 112 may process data and/or information related to a data acquisition module to execute one or more functions described in the application. For example, the processing device 112 may receive the first data fed back by the target terminal 130 and determine a second data acquisition module. In some embodiments, the processing device 112 may include one or more sub processing devices (for example, a single-core processing device or a multi-core processing device). Merely as an example, the processing device 112 may include a Central Processing Unit (CPU), an Application Specific Integrated Circuit (ASIC), an Application Specific Instruction Processor (ASIP), a Graphics Processing Unit (GPU), a Physics Processing Unit (PPU), a Digital Signal Processor (DSP), a Field-Programmable Gate Array (FPGA), a Programmable Logic Device (PLD), a controller, a microcontroller unit, a Reduced Instruction Set Computer (RISC), a microprocessor, or any combination thereof.

The network 120 may facilitate exchange of data and/or information, and the data and/or the information may include multiple texts fed back by the target terminal 130. In some embodiments, one or more components (for example, the server 110, the target terminal 130, the database 140, and the acquisition terminal 150) in the online data acquisition system 100 may send data and/or information to the other components in the online data acquisition system 100 through the network 120. In some embodiments, the network 120 may be any type of wired or wireless network. For example, the network 120 may include a cable network, a wired network, an optical fiber network, a telecommunication network, an internal network, the Internet, a Local Area Network (LAN), a Wide Area Network (WAN), a Wireless LAN (WLAN), a Metropolitan Area Network (MAN), a Public Switched Telephone Network (PSTN), a Bluetooth network, a ZigBee network, a Near Field Communication (NFC) network, or any combination thereof. In some embodiments, the network 120 may include one or more network access points. For example, the network 120 may include wired or wireless network access points, for example, base station and/or Internet switch points 120-1, 120-2, . . . . Through these access points, one or more components of the online data acquisition system 100 may be connected to the network 120 to exchange data and/or information.

The target terminal 130 may refer to a terminal of a device configured for a user (for example, a respondent of a questionnaire) to feed back the first data or second data (one or more answers of the questionnaire), and may include one or any combination of a mobile phone 130-1, a tablet computer 130-2, a notebook computer 130-3, etc. In some embodiments, the target terminal 130 may include an apparatus with an input function to input an answer to a survey question. In some embodiments, the target terminal 130 may send the fed back data to the server 110.

The database 140 is a source configured to provide other information for the system 100. The database 140 may be configured to provide service related information for the system 100, for example, the number of users answering online, time when the user answers online, and a word count of a text input by the user. For another example, the database 140 may also include information of the user answering online, historical answers, etc. The information of the user may include the name of the user, the age of the user, the occupation of the user, etc. The database 140 may be implemented in a single central server, and multiple servers or multiple personal devices connected through communication links. The database 140 may be generated by multiple personal devices and a cloud server. In some embodiments, the database 140 may store the data fed back by the target terminal 130, for example, the answer of the respondent to the survey question. In some embodiments, the database 140 may store information and/or instructions executed or used by the server 110 to execute exemplary methods described in the application. In some embodiments, the database 140 may include a high-capacity memory, a removable memory, a volatile read-write memory (for example, a Random Access Memory (RAM)), a Read-Only Memory (ROM), or any combination thereof. In some embodiments, the database 140 may be implemented in the cloud platform. For example, the cloud platform may include a private cloud, a public cloud, a mixed cloud, a community cloud, a distributed cloud, an internal cloud, or any combination thereof.

In some embodiments, the database 140 may be connected with the network 120 to communicate with one or more components (for example, the server 110, the target terminal 130, and the acquisition terminal 150) of the system 100. One or more components of the online data acquisition system 100 may access the data or instructions stored in the database 140 through the network 120, for example, answers to open questionnaire survey like employee engagement survey, employee satisfaction survey, and customer satisfaction survey. In some embodiments, the database 140 may directly be connected or communicate with one or more components (for example, the server 110, the target terminal 130, and the acquisition terminal 150) in the online data acquisition system 100. In some embodiments, the database 140 may be a part of the server 110.

In some embodiments, the acquisition terminal 150 may be a terminal of a device configured to acquire data, and for example, may be a terminal device configured to generate the survey question. The acquisition terminal 150 may include one or any combination of a mobile phone 150-1, a tablet computer 150-2, a notebook computer 150-3, etc.

Figure 2:
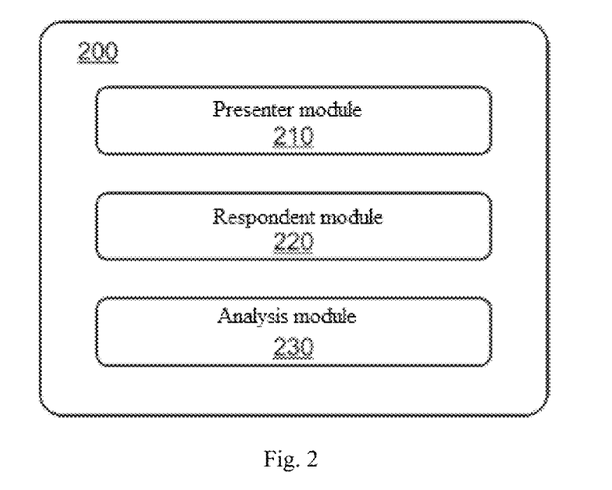
FIG. 2 is an exemplary module diagram of an online data acquisition system according to some embodiments of the application.

FIG. 2 is an exemplary module diagram of an online data acquisition system 200 according to some embodiments of the specification. As shown in FIG. 2, the online data acquisition system 200 includes a presenter module 210, a respondent module 220, and an analysis module 230.

The presenter module 210 may be configured for an acquisition terminal to generate a first data acquisition module online according to a preset rule, and send the first data acquisition module to multiple first target terminals. In some embodiments, the presenter module 210 may be configured for the acquisition terminal to generate a survey question online according to a survey question outline, and send the survey question to terminals used by multiple respondents. In some embodiments, the survey question outline may be configured to determine specific questions to be asked. In some embodiments, the multiple first target terminals are terminals used by more than 20 respondents answering survey questions.

In some embodiments, after the multiple pieces of first data fed back by the multiple first target terminals are returned to the acquisition terminal online, the presenter module 210 may be configured for the acquisition terminal to generate a second data acquisition module online according to the multiple pieces of first data and/or the preset rule, and send the second data acquisition module to the multiple first target terminals online. For example, after the multiple respondents answer the survey question generated by the presenter module 210 in predetermined time, the presenter module 210 may generate a new question according to the survey question outline and send it to these respondents. For another example, after the multiple respondents answer the survey question generated by the presenter module 210 in predetermined time, the presenter module 210 may generate new survey questions for different respondents according to answers of these respondents to the survey question and then send them to different respondents. For example, for survey question "Are you satisfied with our products", if respondent A answers satisfied, and respondent B answers unsatisfied, new survey question "What are you unsatisfied with" may be generated and sent to respondent B.

The respondent module 220 may be configured for the multiple first target terminals to, after receiving the first data acquisition module online, feed back multiple pieces of first data online in first preset time, and return the multiple pieces of fed back first data to the acquisition terminal online. In some embodiments, the respondent module 220 may be configured for the multiple first target terminals to receive the survey question in the first data acquisition module and complete answering the survey question in the first preset time to obtain the first data generated by answering.

In some embodiments, the respondent module 220 may be configured for the multiple first target terminals to feed back multiple pieces of second data online in second preset time after receiving the second data acquisition module online.

The analysis module 230 may be configured for the acquisition terminal to perform online analysis based on the multiple pieces of received first data.

In some embodiments, the analysis module 230 may be configured for the acquisition terminal to perform online analysis based on the multiple pieces of received second data.

In some embodiments, the analysis module 230 may be configured for the acquisition terminal to perform online analysis on the multiple pieces of first data and/or the multiple pieces of second data according to related information of the first data acquisition module and/or the second data acquisition module. The related information includes a type and/or importance.

In some embodiments, when the type in the related information is an open question, the analysis module 230 may be configured for the acquisition terminal to input the multiple pieces of first data and/or multiple pieces of second data fed back by the multiple first target terminals for the open question to a text recognition model to obtain recognition results. The recognition result includes a viewpoint extraction result and/or a viewpoint clustering result. The text recognition model is a text classification model and/or an unsupervised learning clustering model.

In some embodiments, when the type in the related information is a choice question, a true-false question, a click-to-select question, or an image hotspot question, the analysis module 230 may be configured for the acquisition terminal to make statistics to the numbers of times that different options are selected and/or ratios of the different options in the multiple pieces of first data and/or multiple pieces of second data fed back by the multiple first target terminals for the choice question, the true-false question, the click-to-select question, or the image hotspot question.

In some embodiments, when the type in the related information is a sequencing question, the analysis module 230 may be configured for the acquisition terminal to make statistics to sequencing results of each option in the multiple pieces of first data and/or multiple pieces of second data fed back by the multiple first target terminals for the sequencing question.

In some embodiments, the online data acquisition system 200 may further include a training module, configured to train the text classification model. Specifically, the training module obtains at least one response information text of at least one open question, makes a label of the at least one response information text, the label representing a viewpoint of each of at least one piece of response information, inputs the response information text containing the label to an initial text classification model, and performs training to obtain a trained text classification model.

Figure 3:
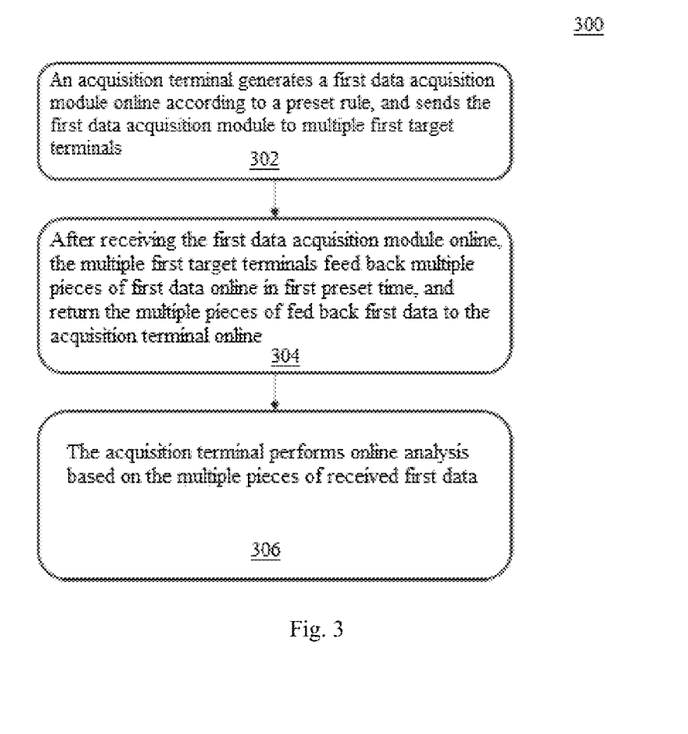
FIG. 3 is an exemplary flowchart of an online data acquisition method 300 according to some embodiments of the application.

FIG. 3 is an exemplary flowchart of an online data acquisition method 300 according to some embodiments of the application. As shown in FIG. 3, the online data acquisition method 300 includes the following steps.

In Step 302, an acquisition terminal generates a first data acquisition module online according to a preset rule, and sends the first data acquisition module to multiple first target terminals. Specifically, the step may be executed by a presenter module 210.

The acquisition terminal may have multiple functions. In some embodiments, the acquisition terminal may have corresponding functions according to different application scenes. For example, the acquisition terminal may be applied to an online survey scene, and correspondingly, the acquisition terminal may have a survey question editing function.

In some embodiments, the first data acquisition module may be generated online according to the preset rule. The first data acquisition module refers to a module containing data requiring feedback of a user (for example, a user corresponding to the first target terminal). The data may be any data. In some embodiments, the data may include a survey question, etc.

In some embodiments, the preset rule may be a rule matched with the data contained in the first data acquisition module. For example, if the data contained in the first data acquisition module is the survey question, the preset rule may be a survey question outline. In some embodiments, the survey question outline may be a question point outline, namely specific survey questions may further be determined according to the survey question outline. For example, for satisfaction survey, the survey question outline may be "1: ask if satisfied; 2: ask the satisfied person for the most satisfactory part; 3: ask the unsatisfied person why unsatisfied; and 4: after the unsatisfied person answers why unsatisfied, ask for an advice about the improvement direction". For the example, the first data acquisition module containing survey question "Are you satisfied with our service today" may be generated.

In some embodiments, the survey question outline may also be a content outline formed by multiple specific survey questions. For example, the survey question outline may be: 1: What is your gender? 2: How old are your actually? and 3: Which consumer genetic testing companies have you ever heard of/seen before?

In some embodiments, a question editor may edit the survey question online in the acquisition terminal through the survey question outline to generate the first data acquisition module.

In some embodiments, a type of the survey question may be any type, for example, a word click-to-select question, an image hotspot question, and a sequencing question. The word click-to-select question is configured for the first target terminal to answer a hot word in the question, and the hot word is any word set by the acquisition terminal. The image hotspot question is configured for the first target terminal to answer a hotspot in the question, and the hotspot is any region in an image set by the acquisition terminal. The sequencing question is configured for the first target terminal to answer an arrangement sequence in the question.

In some embodiments, a target terminal may refer to a terminal that receives a data acquisition module and gives a real-time feedback online for the data acquisition module, or may be a terminal device used by a respondent who gives a real-time feedback for the data acquisition module. For example, the target terminal may be a terminal device used by a respondent who answers the survey question in real time. The terminal device may be a mobile phone, a notebook computer, etc. Specifically, after the target terminal receives the survey question in the data acquisition module, the respondent (or called a survey subject) may answer the survey question online in real time through the terminal.

In some embodiments, the acquisition terminal may generate a first survey question online according to the survey question outline, and send the first survey question to the multiple first target terminals. In some embodiments, the multiple first target terminals may be terminals used by more than 20 respondents answering the survey question. For example, the multiple target terminals may be terminals used by a hundred, a thousand, and 10 thousand respondents.

In Step 304, after receiving the first data acquisition module online, the multiple first target terminals feed back multiple pieces of first data online in first preset time, and return the multiple pieces of fed back first data to the acquisition terminal online. Specifically, the step may be executed by a respondent module 220.

The first preset time refers to specified answering time that the multiple first target terminals answer the first survey question. The first preset time may be flexibly set as practically required. In some embodiments, the first preset time may be set according to a type of the first survey question. For example, answering time for a choice question is 5 minutes, and answering time for an open question is 30 minutes.

The whole process of Step 302 and Step 304 is implemented online in real time. Specifically, the process that the acquisition terminal generates the first survey question and the multiple first target terminals feed back the multiple pieces of first data is implemented online in real time, namely the acquisition terminal sends the first survey question to the multiple first target terminals to answer in real time immediately when generating the first survey question.

In some embodiments, the multiple first target terminals simultaneously feed back the first data for the first survey question. Specifically, the multiple respondents may give feedbacks for (namely answer) the first survey question by manual input, voice input, or other manners in the corresponding first target terminals.

In Step 306, the acquisition terminal performs online analysis based on the multiple pieces of received first data. Specifically, the step may be executed by an analysis module 230.

In some embodiments, the acquisition terminal may be a question editing terminal with the survey question editing function, or may be an observation terminal with a function of observing the whole survey process in real time. The observation terminal may be a terminal used by an observer invited by the question editor in the question editing terminal. Specifically, the question editor may send an invitation link to a mailbox of the observer to invite the observer to observe the whole survey process, and the observer may click the invitation link to accept an invitation of the question editor.

In some embodiments, online real-time analysis may be performed in the question editing terminal and/or the observation terminal based on the multiple pieces of received first data. More details for online real-time analysis over the data have been described elsewhere in the specification, and elaborations are omitted herein.

Through the above description, the acquisition terminal may send the first data acquisition module to the multiple first target terminals, namely the first survey question may be sent to the multiple respondents to answer, to implement one-to-many online survey, so that the survey cost is reduced. The multiple first target terminals feed back the multiple pieces of first data online in the first preset time after receiving the first data acquisition module online, namely the multiple first target terminals answer the survey question in the same answering time, so that it is ensured that survey is performed in real time, the acquisition terminal may receive the first data approximately synchronously and further subsequently implement data analysis without any delay, the data analysis efficiency is improved, and the data analysis time is shortened.

Before the respondent answers the survey question, the respondent may be determined by screening. The first target terminal may refer to a terminal determined in a specific manner before the target terminal gives a feedback for the first data acquisition module. For example, the first target terminal may be a terminal used by the respondent determined in a certain screening manner before survey.

In some embodiments, recruitment information may be sent, and the first target terminal may be determined based on a feedback of the target terminal for the recruitment information. Specifically, recruitment information is sent to multiple terminals online, and the multiple terminals give multiple pieces of feedback information for the recruitment information. The acquisition terminal screens the feedback information according to a preset screening rule, and determines the terminals corresponding to feedback information obtained by screening as the first target terminals. The recruitment information may be any information. For example, the recruitment information may be a recruitment questionnaire. In such case, the preset screening rule may be a rule for screening feedback information for the recruitment questionnaire. The preset screening rule may be flexibly set as practically required. For example, survey questions of an age option, a gender option, an occupation option, etc., may be set in the recruitment questionnaire. If the preset screening rule is female investor aged between 25 and 27, a female user filling in the age of 25 to 27 and the occupation of investment may be determined as a first target user, and a terminal used by the first target user is determined as a first target terminal. The feedback information may be screened to determine the right respondents for survey, so that the survey accuracy may be improved.

In some embodiments, the respondents corresponding to the multiple first target terminals determined by screening may also join an online group (for example, a WeChat group and a QQ group) by scanning an identification code (for example, a two-dimensional code and a barcode) such that a manager in the online group may manage the respondents and answer doubts of the respondents in the group to ensure that the respondents in the group may smoothly participate in survey. In some embodiments, the identification code may be set in the recruitment questionnaire.

Figure 4:
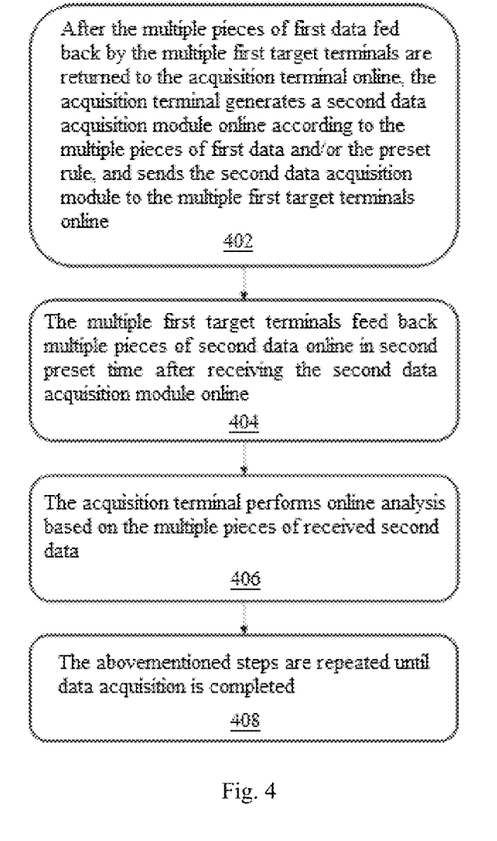
FIG. 4 is another exemplary flowchart of an online data acquisition method 400 according to some embodiments of the application.

FIG. 4 is another exemplary flowchart of an online data acquisition method 400 according to some embodiments of the application. As shown in FIG. 4, the online data acquisition method 400 includes the following steps.

In Step 402, after the multiple pieces of first data fed back by the multiple first target terminals are returned to the acquisition terminal online, the acquisition terminal generates a second data acquisition module online according to the multiple pieces of first data and/or the preset rule, and sends the second data acquisition module to the multiple first target terminals online. Specifically, Step 402 may be executed by the presenter module 210.

In some embodiments, the acquisition terminal may generate a second survey question according to the multiple pieces of first data of answers of the multiple first target terminals to the first survey question, and send the second survey question to the first target terminals online.

In some embodiments, for the second survey question, a corresponding survey question may be generated according to the answers (i.e., the first data) of the respondents to the first survey question, and the corresponding survey question may be sent to the corresponding first target terminals. Specifically, survey question A is generated according to a first-type answer, survey question B is generated according to a second-type answer, and so on. Then, survey question A is sent to the first target terminal that gives the first-type answer, survey question B is sent to the first target terminal that gives the second-type answer, and so on. For example, the first survey question is "Why do you like the product", and the first target terminals are terminals used by respondent A and respondent B respectively. If first data of an answer of respondent A is Because I think the product is in bright color, and first data of an answer of respondent B is Because I like the efficacy of the product, the acquisition terminal may generate a second survey question "Where is the bright color specifically embodied?" according to the first data of respondent A and send the second survey question to the terminal used by respondent A, or may generate a second survey question "Which specific efficacy of the product do you like?" according to the first data of respondent B and send the second survey question to the terminal used by respondent B.

In some embodiments, the acquisition terminal may simultaneously send the corresponding second survey question generated based on the first data to the corresponding first target terminal online. Still in the abovementioned example, the acquisition terminal may simultaneously send "Where is the bright color specifically embodied" and "Which specific efficacy of the product do you like" to respondent A and respondent B respectively.

According to the above description, at least one second survey question is generated according to the multiple pieces of first data of the answers of the first target terminals to the first survey question, and the at least one second survey question is sent to the first target terminals online. That is, different second survey questions may be determined according to the answers of the first target terminals to the first survey question, and the different second survey questions are pertinently sent to the corresponding first target terminals, to implement multilevel questioning over the respondents. Therefore, deep survey is implemented, and the survey accuracy is improved.

In some embodiments, the acquisition terminal may also generate the second data acquisition module online according to the preset rule, and send the second data acquisition module to the multiple first target terminals online. The preset rule may be the survey question outline. In some embodiments, the second survey question may be generated according to the survey outline, namely the second survey question is generated as required by the outline and sent to the first target terminals that answer the first survey question. In some embodiments, the second data acquisition module may be the same as the first data acquisition module, or may be different from the first data acquisition module. Taking the condition that the survey question outline is a content outline formed by multiple specific survey questions as an example, the survey question outline is "1: What is your gender? 2: How old are your actually? and 3: Which consumer genetic testing companies have you ever heard of/seen before?". If the first survey question is the first question, the second survey question may still be question 1, or may be any question in question 2 and question 3.

In Step 404, the multiple first target terminals feed back multiple pieces of second data online in second preset time after receiving the second data acquisition module online. Specifically, Step 404 may be executed by the respondent module 220.

In some embodiments, the second preset time may be the same as or different from the first preset time. The second preset time refers to specified answering time that the multiple first target terminals answer the second survey question. The second preset time may be flexibly set as practically required. In some embodiments, the second preset time may be set according to a type of the second survey question. For example, answering time for a choice question is 5 minutes, and answering time for an open question is 30 minutes.

In some embodiments, the second data may be an answer content of the respondent corresponding to the first target terminal for the second survey question. Still taking the second survey question "Where is the bright color specifically embodied?" as an example, if the respondent corresponding to the first target terminal answers "I think the product is bright and rich in color", the answer is second data.

In some embodiments, the multiple first target terminals simultaneously feed back the second data for the second survey question. Specifically, the multiple respondents may give feedbacks for (namely answer) the second survey question by manual input, voice input, or other manners in the corresponding first target terminals.

In Step 406, the acquisition terminal performs online analysis based on the multiple pieces of received second data. Specifically, Step 406 may be executed by the analysis module 230.

In some embodiments, online real-time analysis may be performed in the question editing terminal and/or the observation terminal based on the multiple pieces of received second data. Specifically, the question editing terminal and the observation terminal have been described in the abovementioned contents, and thus will not be elaborated herein.

In Step 408, the abovementioned steps are repeated until data acquisition is completed.

In some embodiments, completion of data acquisition may represent that feedback information is obtained for all survey questions generated according to the survey question outline. For example, five survey questions may be generated according to the survey question outline, and if the target terminals give feedbacks for all the five survey questions, it is considered that data acquisition is completed.

In some embodiments, online real-time analysis may also be performed according to the multiple pieces of first data and/or the multiple pieces of second data to achieve a purpose of helping the user to make a decision according to a survey analysis result.

In some embodiments, the acquisition terminal performs online analysis on the multiple pieces of first data and/or the multiple pieces of second data according to related information of the first data acquisition module and/or the second data acquisition module. In some embodiments, the acquisition terminal may acquire the related information according to identifiers/an identifier contained in the first data acquisition module and/or the second data acquisition module. The related information includes a type and/or importance. Correspondingly, type information may be acquired using a type identifier, and importance information may be acquired using an importance identifier. In some embodiments, the type may represent the type of the question, and for example, may include a choice question, a true-false question, a click-to-select question, an image hotspot question, a sequencing question, and an open question. The importance may be importance of the data, and for example, may represent an importance degree of the survey question, for example, very important, a little important, and unimportant. The importance of the question may be determined by an investigator according to different conditions. For example, a certain restaurant needs to survey dining conditions of diners, and particularly wants to know feedbacks of the diners for new dishes, and questions about the new dishes in survey questions are of the highest importance level.

In some embodiments, the type in the related information may be an open question. In such case, the acquisition terminal inputs the multiple pieces of first data and/or multiple pieces of second data fed back by the multiple first target terminals for the open question to a text recognition model to obtain recognition results. The recognition result may include a viewpoint extraction result and/or a viewpoint clustering result. Specifically, an answer (for example, first data and/or second data) of a respondent to the open question may be input to the text classification model to determine a viewpoint of the answer, for example, satisfied and unsatisfied. In some embodiments, the viewpoint extraction results may be clustered based on a clustering algorithm or an unsupervised clustering model. For example, semantic similarities may be calculated according to the viewpoint extraction results, thereby performing clustering aggregation on the viewpoint extraction results according to the semantic similarities to obtain a viewpoint clustering result. In some embodiments, the viewpoint extraction results may be input to a semantic similarity model to obtain the semantic similarities. In some embodiments, the semantic similarity model may adopt a supervised neural network matching model SimNet.

In some embodiments, the text recognition model may be a text classification model for viewpoint extraction. In some embodiments, the text recognition model may be a deep-learning-based text classification model, for example, a TextCNN+softmax model. Herein, TextCNN has an automatic text feature extraction function, softmax is used for text classification, and softmax is required to be trained to endow trained softmax with type prediction and viewpoint extraction functions.

In some embodiments, the text recognition model may also be Bayes, Support Vector Machine (SVM), and eXtreme Gradient Boosting (xgboost) classifiers, etc. In the implementation mode, a feature is required to be extracted at first in manners of Term Frequency-Inverse Document Frequency (TF-IDF), statistical term frequency, etc., and then the classifier is trained to endow the trained classifier with the viewpoint extraction function.

In some embodiments, the text recognition model may also be an unsupervised learning clustering model. An algorithm of the unsupervised learning clustering model may adopt a K-means algorithm, a hierarchical clustering algorithm, etc.

In some embodiments, the type in the related information may be a choice question, a true-false question, a click-to-select question, or an image hotspot question. In such case, the acquisition terminal makes statistics to the numbers of times that different options are selected and/or ratios of the different options in the multiple pieces of first data and/or multiple pieces of second data fed back by the multiple first target terminals for the choice question, the true-false question, the click-to-select question, or the image hotspot question.

In some embodiments, the ratios may refer to ratios of the numbers of times that the different options are selected in the first data and/or the second data to the total number of target terminals that answer the question. Taking analysis over the first data as an example, if the survey question corresponding to the first data is a multiple-choice question, the number of the first target terminals that feed back the first data is 100, the multiple-choice question has four options ABCD, and selection conditions of different options in the first data are as follows: A-90, B-50, C-80, and D-80, the ratios are: option A-90/100, option B-50/100, option C-80/100, and option D-80/100.

In some embodiments, the ratios may also be ratios of the numbers of times that the different options are selected in the first data and/or the second data to the total number of times that all the options in the survey question corresponding to the first data and/or the second data are selected. Descriptions are still made with the abovementioned example. The total number of times that the options in the survey question corresponding to the first data are selected respectively is 90+50+80+80=300, and the ratios are: option A-90/300, option B-50/300, option C-80/300, and option D-80/300.

In some embodiments, the type in the related information may be a sequencing question. In such case, the acquisition terminal makes statistics to sequencing results of each option in the multiple pieces of first data and/or multiple pieces of second data fed back by the multiple first target terminals for the sequencing question. Taking the condition that the first target terminals feed back the first data for the first survey question and the number of the multiple first target terminals that answer is 20 as an example, if the first survey question is "Please list five main reasons why you buy the product from a certain Application (APP) and sequence the five main reasons", the multiple pieces of first data statistically obtained by the acquisition terminal are "great promotion strength, I need the product, and the product is reliable and worth buying" respectively, and it is statistically obtained that 13 first target terminals put "great promotion strength" in the first place, 6 first target terminals put "I need the product" in the second place and one first target terminal puts "the product is reliable and worth buying", a sequencing result of the sequencing question is "1: great promotion strength; 2: I need the product; and 3: the product is reliable and worth buying".

In some embodiments, statistics may be manual statistics, or may be algorithm-based statistics, for example, hashtable-based statistics.

Figure 5:
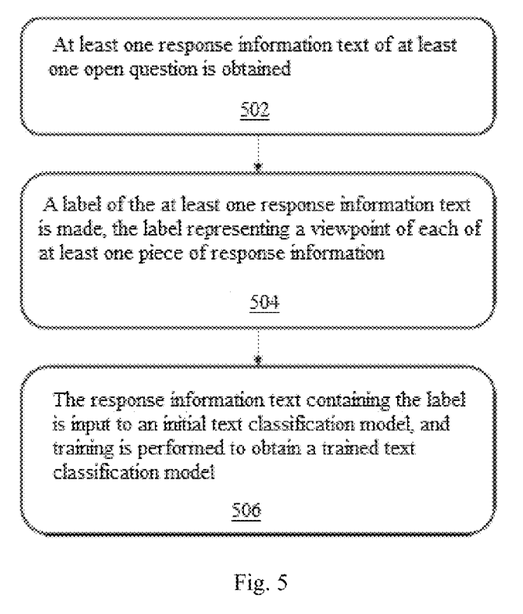
FIG. 5 is an exemplary flowchart of a training method 500 for a text classification model according to some embodiments of the application.

FIG. 5 is an exemplary flowchart of a training method 500 for a text classification model according to some embodiments of the specification. As shown in FIG. 5, the training method 500 includes the following steps.

In Step 502, at least one response information text of at least one open question is obtained. Specifically, Step 502 may be executed by a training model.

In some embodiments, historical response information of open questions in historical surveys may be acquired through a database, and the historical response information is determined as a response information text. Alternatively, the response information text may be acquired through a corpus crawling network data.

In Step 504, a label of the at least one response information text is made, the label representing a viewpoint of each of at least one piece of response information. Specifically, Step 504 may be executed by the training model.

In some embodiments, a process of making the label of the at least one response information text may be completed manually, namely the viewpoint of the response information text is manually judged, and the response information text is further labeled to contain the label in the response information text. In some embodiments, viewpoint extraction may also be regularly performed on the response information text to contain the viewpoint label in the response information text.

In Step 506, the response information text containing the label is input to an initial text classification model, and training is performed to obtain a trained text classification model. Specifically, Step 506 may be executed by the training model.

In some embodiments, the initial text recognition model may be a text classification model for viewpoint extraction. In some embodiments, the initial text recognition model may be a deep-learning-based text classification model, for example, a TextCNN+softmax model. Herein, TextCNN has the automatic text feature extraction function, softmax is used for text classification, and softmax is required to be trained to endow trained softmax with the type prediction and viewpoint extraction functions. In some embodiments, the text recognition model may also be an unsupervised learning clustering model. An algorithm of the unsupervised learning clustering model may adopt the K-means algorithm, the hierarchical clustering algorithm, etc. In some embodiments, the initial text recognition model obtained after fixed M rounds of training (for example, 1,000 rounds of training) may be determined as the trained text recognition model. In some embodiments, under the condition that a loss function of the initial text recognition model obtained after multiple continuous rounds of training reflects that the model may predict the viewpoint and/or viewpoint type of the response information text accurately, training may be ended, and the initial text recognition model obtained by this round of training is determined as the trained text recognition model.

Figure 6:
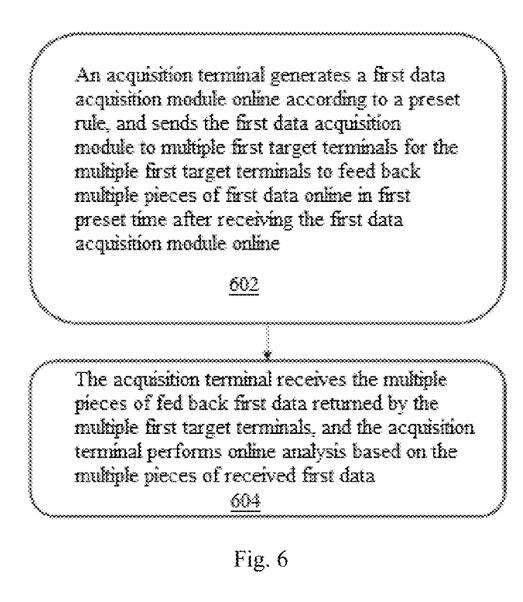
FIG. 6 is an exemplary flowchart of an online data acquisition method according to some embodiments of the application.

FIG. 6 is an online data acquisition method according to an embodiment of the specification. The method is applied to an acquisition terminal. The acquisition terminal may be one or any combination of a mobile phone, a tablet computer, a notebook computer, etc. The method includes the following steps.

In Step 602, an acquisition terminal generates a first data acquisition module online according to a preset rule, and sends the first data acquisition module to multiple first target terminals for the multiple first target terminals to feed back multiple pieces of first data online in first preset time after receiving the first data acquisition module online.

In Step 604, the acquisition terminal receives the multiple pieces of fed back first data returned by the multiple first target terminals, and the acquisition terminal performs online analysis based on the multiple pieces of received first data.

In some embodiments, after the operation that the acquisition terminal receives the multiple pieces of fed back first data returned by the multiple first target terminals, the method further includes that: the acquisition terminal generates online according to the multiple pieces of first data and/or the preset rule, and sends the second data acquisition module to the multiple first target terminals online for the multiple first target terminals to feed back multiple pieces of second data online in second preset time after receiving the second data acquisition module online; the acquisition terminal performs online analysis based on the multiple pieces of received second data; and the steps are repeated until data acquisition is completed.

In some embodiments, the acquisition terminal performs online analysis on the multiple pieces of first data and/or the multiple pieces of second data according to related information of the first data acquisition module and/or the second data acquisition module. The operation that the acquisition terminal performs online analysis on the multiple pieces of first data and/or the multiple pieces of second data according to the related information of the first data acquisition module and/or the second data acquisition module includes that: when a type in the related information is an open question, the acquisition terminal inputs the multiple pieces of first data and/or multiple pieces of second data fed back by the multiple first target terminals for the open question to a text recognition model to obtain recognition results; when the type in the related information is a choice question, a true-false question, a click-to-select question, or an image hotspot question, the acquisition terminal makes statistics to the numbers of times that different options are selected and/or ratios of the different options in the multiple pieces of first data and/or multiple pieces of second data fed back by the multiple first target terminals for the choice question, the true-false question, the click-to-select question, or the image hotspot question; and when the type in the related information is a sequencing question, the acquisition terminal makes statistics to sequencing results of each option in the multiple pieces of first data and/or multiple pieces of second data fed back by the multiple first target terminals for the sequencing question.

Descriptions about all the steps in FIG. 6 and each step in some subsequent embodiments may refer to the related descriptions in embodiments in FIG. 1 to FIG. 5, and elaborations are omitted herein.

Figure 7:
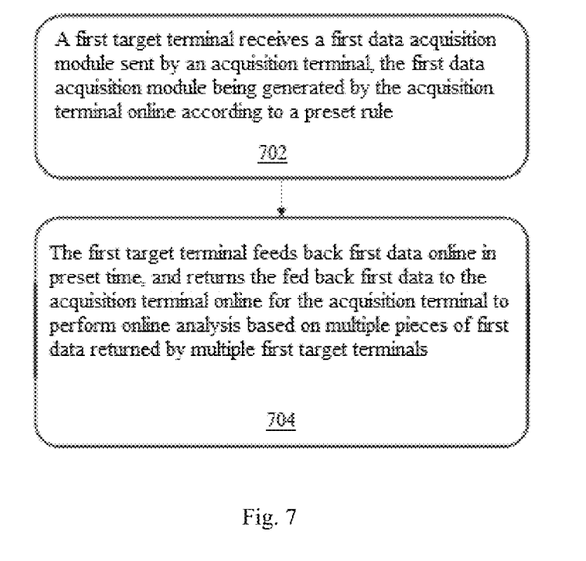
FIG. 7 is an exemplary flowchart of an online data acquisition method according to some embodiments of the application.

FIG. 7 is an online data acquisition method according to an embodiment of the specification. The method is applied to a first target terminal side. The first target terminal may be one or any combination of a mobile phone, a tablet computer, a notebook computer, etc. The method includes the following steps.

In Step 702, a first target terminal receives a first data acquisition module sent by an acquisition terminal, the first data acquisition module being generated by the acquisition terminal online according to a preset rule.

In Step 704, the first target terminal feeds back first data online in preset time, and returns the fed back first data to the acquisition terminal online for the acquisition terminal to perform online analysis based on multiple pieces of first data returned by multiple first target terminals.

Descriptions about all the steps in FIG. 7 may refer to the related descriptions in embodiments in FIG. 1 to FIG. 5, and elaborations are omitted herein.

Another aspect of the embodiments of the specification provides an online data acquisition system, which includes an acquisition terminal and multiple first target terminals.

The acquisition terminal is configured to execute the online data acquisition method provided in FIG. 6.

The first target terminal is configured to execute the online data acquisition method provided in FIG. 7.

It is to be noted that the contents described in all the embodiments of the application may refer to one another, and no limits are made in the application.

Another aspect of the embodiments of the specification provides an online data acquisition apparatus, which includes a processor, configured to execute the abovementioned online data acquisition method.

Another aspect of the embodiments of the specification provides a computer-readable storage medium, which stores a computer instruction. The computer executes the abovementioned online data acquisition method after reading the computer instruction in the storage medium.

The embodiments of the specification may have, but not limited to, the following beneficial effects. (1) According to the embodiments in the specification, the acquisition terminal may send a survey question to multiple respondents to answer to implement one-to-many online survey, so that the survey cost is reduced. (2) Multiple first target terminals simultaneously feed back multiple pieces of first data and/or second data online in preset time, so that it is ensured that survey is performed in real time, and the acquisition terminal may receive the multiple pieces of first data and/or second data approximately synchronously and further subsequently analyze the first data and/or the second data without any delay. (3) The first data and/or the second data may be analyzed according to related information to implement viewpoint extraction and/or viewpoint clustering of open questions and analyze the open questions more comprehensively and completely, so that the survey accuracy is improved, and users are helped more to make corresponding decisions. It is to be noted that different beneficial effects may be achieved in different embodiments. The beneficial effects achievable in different embodiments may be any one or combination of the above, or may be any other achievable beneficial effects.

The basic concepts have been described above. It is apparent to those skilled in the art that the above detailed disclosures are merely examples and not intended to limit the specification. Those skilled in the art may make various modifications, improvements, and corrections to the specification, even though not specified herein. Such modifications, improvements, and corrections are suggested in the specification, and thus still fall within the spirit and scope of the exemplary embodiments of the specification.

In addition, specific terms are used in the specification to describe the embodiments of the specification. For example, "an embodiment", "one embodiment", and/or "some embodiments" mean/means a certain feature, structure, or characteristic related to at least one embodiment of the specification. Therefore, it is to be emphasized and noted that "one embodiment", or "an embodiment", or "an alternative embodiment" mentioned twice or for many times at different positions in the specification does not always refer to the same embodiment. In addition, some features, structures, or characteristics in one or more embodiments of the specification may be combined as appropriate.

In addition, those skilled in the art can understand that each aspect of the specification may be explained and described with a plurality of patentable sorts or conditions, including combinations of any new or useful procedures, machines, products, or substance, or any new and useful improvements thereof. Correspondingly, each aspect of the specification may be executed completely by hardware, executed completely by software (including firmware, resident software, microcodes, etc.), or executed by a combination of the hardware and the software. The hardware or software may be called a "data block", "module", "engine", "unit", "component", or "system". In addition, each aspect of the specification may be represented as a computer product in one or more computer-readable media, and the product includes a computer-readable program code.

The computer storage medium may include a propagated data signal with a computer program code therein, for example, on a baseband or as a part of a carrier. The propagated signal may be represented in many forms, including an electromagnetic form, an optical form, the like, or a proper combination form. The computer storage medium may be any computer-readable medium except a computer-readable storage medium, and the medium is connected to at least one instruction execution system, apparatus, or device to implement a program for communication, propagation, or transmission. The program code in the computer storage medium may be propagated through any suitable medium, including radio, a cable, an optical fiber, a Radio Frequency (RF), a similar medium, or any combination of the media.

The computer program code required by the operation of each part of the specification may be written by any one or more programming languages, including an object-oriented programming language such as Java, Scala, Smalltalk, Eiffel, JADE, Emerald, C++, C#, VB.NET, and Python, a conventional procedural programming language such as C language, Visual Basic, Fortran2003, Perl, COBOL2002, PHP, and ABAP, a dynamic programming language such as Python, Ruby, and Groovy, another programming language, etc. The program code may run completely in a user computer, or run in the user computer as an independent software package, or partially run in the user computer and partially run in a remote computer, or run completely in the remote computer or a processing device. Under the latter condition, the remote computer may be connected with the user computer through any network form such as a LAN or a WAN, or connected to an external computer (for example, through the Internet), or in a cloud computing environment, or used as service such as Software as a Service (SaaS).

In addition, unless specified in the claims, the order of the processing elements and sequence, use of numerals and letters, or use of other names in the specification is not intended to limit the orders of the flows and methods of the specification. Although some invention embodiments that seem useful at present are discussed through various examples in the above disclosure, it should be understood that such details only achieve a purpose of description, and the appended claims are not limited to the disclosed embodiments and intended to cover all corrections and equivalent combinations consistent with the essence and scope of the embodiments of the specification instead. For example, the system component described above may be implemented through a hardware device, but may also be implemented only through a software solution. For example, the described system is installed in an existing processing device or mobile device.

Similarly, it should be noted that, for simplifying the expressions disclosed in the specification to help to understand one or more invention embodiments, multiple features may sometimes be incorporated into one embodiment, drawing, or the description thereof in the above description about the embodiments of the specification. However, such a disclosure method does not mean that an object of the specification needs more features than those mentioned in the claims. In practice, the features of the embodiment are fewer than all features of a single embodiment disclosed above.

Numerals describing the numbers of components and attributes are used in some embodiments. It should be understood that such numerals for describing the embodiments are modified with modifiers "about", "approximately", or "substantially" in some examples. Unless otherwise specified, "about", "approximately", or "substantially" represents that the numeral allows a change of ±20%. Correspondingly, in some embodiments, numerical parameters used in the specification and the claims are all approximate values, and the approximate values may change according to characteristics required by individual embodiments. In some embodiments, the numerical parameter should consider specified valid digits and adopt a general digit retention method. Although numerical ranges and parameters, in some embodiments of the specification, used to confirm the breadths of scopes thereof are approximate values, such numerical values are set as accurately as possible in a possible scope in specific embodiments.

The entire contents of each patent, patent application, patent application disclosure, and other materials such as articles, books, specifications, publications, and documents, cited in the specification are incorporated in the specification by reference, except historical application files inconsistent or conflicting with the contents of the specification as well as files (appended to the specification at present or latter) limiting the broadest scope of the claims of the specification. It is to be noted that the description, definition, and/or use of terms in the specification are/is taken as final if the description, definition, and/or use of terms in the materials appended to the specification are/is inconsistent or conflict/conflicts with the contents as described in the specification.

It should finally be understood that the embodiment in the specification is only used to explain the principle of the embodiment of the specification, and other transformations may also fall within the scope of the specification. Therefore, as an example rather than restriction, alternative configuration of the embodiment of the specification may be considered consistent with the teaching of the specification. Correspondingly, the embodiment of the specification is not limited to the embodiment clearly introduced and described in the specification.

Although the implementation modes of the invention are described in combination with the drawings, those skilled in the art may make various modifications and transformations without departing from the spirit and scope of the invention, and all these modifications and transformations fall within the scope defined by the appended claims.

What is claimed is:
1. An online data acquisition method comprising:
sending a recruitment questionnaire online from an acquisition terminal to a plurality of target terminals;
sending feedback information responding to the recruitment questionnaire online from the target terminals to the acquisition terminal;
screening by the acquisition terminal the feedback information sent from the target terminals to the acquisition terminal according to a screening rule and selecting based on the screened feedback information a plurality of first target terminals from among the target terminals which received the recruitment questionnaire;
generating a first data acquisition module by the acquisition terminal according to a preset rule and sending the first data acquisition module from the acquisition terminal to the first target terminals selected by the screening;

sending first data comprising feedback to the first data acquisition module from the first target terminals to the acquisition module in a first preset period of time; and performing online analysis by the acquisition terminal based on the first data fed back by the target terminals.

2. The method as claimed in claim 1, further comprising:

generating a second data acquisition module online by the acquisition terminal according to the first data and/or the preset rule after the first data is sent from the first target terminals to the acquisition terminal and sending the second data acquisition module to the first target terminals online;

sending multiple pieces of second data online as feedback to the second data acquisition module from the first target terminals to the acquisition terminal in a second preset period of time after the first target terminals receive the second data acquisition module online;

performing online analysis by the acquisition terminal based on the second data received from the first target terminals; and repeating the steps until data acquisition is completed.

3. The method as claimed in claim 1, wherein the acquisition terminal performs online analysis on the first data and/or second data according to related information of the first data acquisition module and/or the second data acquisition module.

4. The method as claimed in claim 3, wherein the related information comprises a type and/or importance.

5. The method as claimed in claim 3, wherein performing online analysis by the acquisition terminal on the first data and/or second data according to the related information of the first data acquisition module and/or the second data acquisition module comprises:

when the type in the related information is an open question, inputting by the acquisition terminal the first data and/or second data fed back by the first target terminals for the open question to a text recognition model to obtain recognition results.

6. The method as claimed in claim 5, wherein the recognition result comprises a viewpoint extraction result and/or a viewpoint clustering result.

7. The method as claimed in claim 5, wherein the text recognition model is a text classification model and/or an unsupervised learning clustering model.

8. The method as claimed in claim 7, wherein a training process of the text classification model comprises:

obtaining at least one response information text of at least one open question;

making a label of the at least one response information text, the label representing a viewpoint of each of at least one piece of response information text; and inputting the response information text containing the label to an initial text classification model and performing training to obtain a trained text classification model.

9. The method as claimed in claim 3, wherein performing online analysis by the acquisition module on the first data and/or second data according to the related information of the first data acquisition module and/or the second data acquisition module comprises:

when the type in the related information is a choice question, a true-false question, a click-to-select question, or an image hotspot question, making statistics by the acquisition module to the numbers of times that different options are selected and/or ratios of the different options in the first data and/or second data sent as feedback by the first target terminals for the choice question, the true-false question, the click-to-select question, or the image hotspot question.

10. The method as claimed in claim 3, wherein performing online analysis by the acquisition terminal on the first data and/or second data according to the related information of the first data acquisition module and/or the second data acquisition module comprises:

when the type in the related information is a sequencing question, making statistics by the acquisition terminal to sequencing results of each option in the first data and/or second data sent as feedback by the first target terminals for the sequencing question.

11. The method as claimed in claim 1, wherein the first target terminals are terminals used by more than 20 respondents answering survey questions.

12. The method as claimed in claim 1, wherein the acquisition terminal performs online analysis on the first data and/or the second data according to related information of the first data acquisition module and/or the second data acquisition module, and wherein performing online analysis by the acquisition terminal on the first data and/or second data according to the related information of the first data acquisition module and/or the second data acquisition module comprises:

when a type in the related information is an open question, inputting by the acquisition terminal the first data and/or second data sent as feedback by the first target terminals for the open question to a text recognition model to obtain recognition results;

when the type in the related information is a choice question, a true-false question, a click-to-select question, or an image hotspot question, making statistics by the acquisition terminal to the numbers of times that different options are selected and/or ratios of the different options in the first data and/or second data sent as feedback by the first target terminals for the choice question, the true-false question, the click-to-select question, or the image hotspot question; and when the type in the related information is a sequencing question, making statistics by the acquisition terminal to sequencing results of each option in the first data and/or second data fed back by the first target terminals for the sequencing question.

13. The method as claimed in claim 1, wherein the recruitment questionnaire contains questions concerning characteristics of users of the target terminals.

14. The method as claimed in claim 1, wherein the recruitment questionnaire includes an identification code which can be scanned by a user of a target terminal to join an online group.

15. The method as claimed in claim 1, wherein the first data acquisition module comprises at least one survey question.

16. The method as claimed in claim 1 wherein the first and second data acquisition module each comprise at least one survey question.

* * * * *